United States Patent
Richley et al.

(10) Patent No.: US 6,798,349 B1
(45) Date of Patent: Sep. 28, 2004

(54) PASSIVE MICROWAVE TAG IDENTIFICATION SYSTEM

(75) Inventors: Edward A. Richley, Palo Alto, CA (US); Beverly L. Harrison, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/411,268

(22) Filed: Oct. 4, 1999

(51) Int. Cl.[7] .............................. G08B 5/22
(52) U.S. Cl. .................. 340/825.36; 340/825.49; 340/988; 340/990; 340/995; 340/572.1; 340/572.5; 342/6; 342/42; 342/61; 342/118; 342/147
(58) Field of Search ................ 340/10.41, 825.49, 340/225.36, 988, 990, 989, 995, 572.1, 572.5, 572.9, 572.8, 572.7; 342/25, 5, 6, 44, 42, 29, 30, 147, 118, 114, 61

(56) References Cited

U.S. PATENT DOCUMENTS

| | | | | |
|---|---|---|---|---|
| 5,150,310 A | * | 9/1992 | Greenspun et al. | 342/451 |
| 5,243,530 A | * | 9/1993 | Stanifer et al. | 340/990 |
| 5,448,243 A | * | 9/1995 | Bethke et al. | 342/29 |
| 5,491,482 A | * | 2/1996 | Dingwall et al. | 342/42 |
| 5,517,195 A | * | 5/1996 | Narlow et al. | 340/572.3 |
| 5,598,169 A | * | 1/1997 | Drabeck et al. | 343/701 |
| 5,793,630 A | * | 8/1998 | Theimer et al. | 700/11 |
| 6,023,235 A | * | 2/2000 | Sauer | 342/175 |
| 6,243,012 B1 | * | 6/2001 | Shober et al. | 340/572.7 |
| 6,542,083 B1 | * | 4/2003 | Richley et al. | 340/825.49 |
| 6,600,443 B2 | * | 7/2003 | Landt | 342/42 |

\* cited by examiner

Primary Examiner—Nina Tong
(74) Attorney, Agent, or Firm—Fay, Sharpe, Fagan, Minnich & McKee, LLP

(57) ABSTRACT

A system for identification and tracking of microwave responsive tags, the system comprising, a microwave responsive tag having a passive modulating element to uniquely backscatter directed microwave beams, a microwave base station for directing microwave beams in room sized areas, and a tag tracking system receiving input from the microwave base station, the tag tracking system storing state records of position and informational content of the microwave tag.

20 Claims, 6 Drawing Sheets

FIG. 5
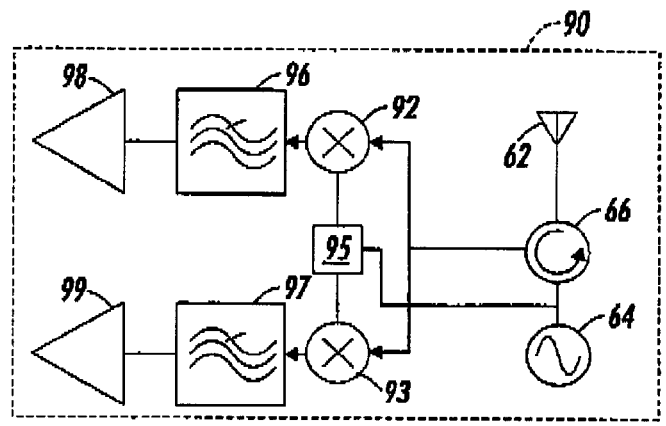
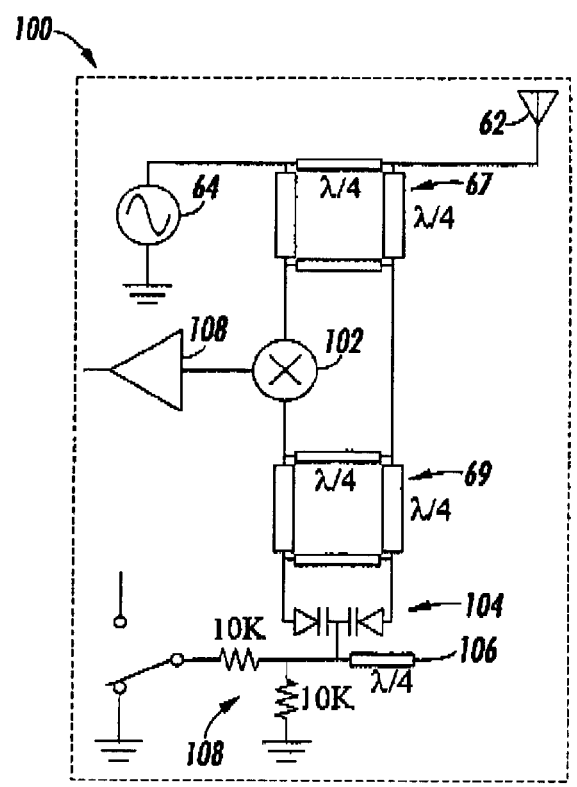
FIG. 6

US 6,798,349 B1

PASSIVE MICROWAVE TAG IDENTIFICATION SYSTEM

FIELD OF THE INVENTION

The present invention relates to identification and localization of objects tagged with passive microwave responsive devices. More particularly, a system architecture facilitating identification of passive microwaves tags in room sized spaces is described.

BACKGROUND AND SUMMARY OF THE INVENTION

Improved information dissemination and organization for individuals or organizations is enhanced with a stable and reliable mechanism for tracking and locating multiple tagged objects in conventional room or office sized areas. Tagged objects can be assembled, manipulated, and maintained to create, alter, preserve, share, or coordinate information. For example, wall mounted pin boards or magnetic boards can be used by an individual or group to transiently or semi-permanently display documents, calendars, task schedules, phone number lists, project proposals, informational flyers, meeting announcements, photographs, maps, or any other desired information. In some cases, small physical artifacts such as keys or magnetic icons can even be attached to the surface.

Advantageously, such tagged documents or objects allow for ready manipulation of documents or artifacts through addition, removal, replacement, reordering, or stacking. For example, a team's project schedule might be represented on a wall mounted pin board by pin attached task cards arranged in a timeline format. Such task cards can be easily altered or physically moved with respect to a displayed timeline as people leave a project, schedules slip, or any other problems develop. Unfortunately, this easy alteration of information by individuals or group members presents its own set of problems. Attached task cards can be inappropriately removed, misplaced, or obscured. Obscuration is a particular problem for still or video camera based tracking systems, infrared or laser systems, or acoustic based systems. Obscuration of such tags can make recording state of the pin board at a given time for electronic archival or tracking purposes effectively impossible.

Accordingly, the present invention automatically or semi-automatically integrates a computational system and a passive microwave based spatial tracking system that does not require an unobscured line of sight for operation. Tagged documents or objects (e.g. a pin board with spatially differentiated pin mounted task cards, each card having an affixed identity tag detectable by microwave tracking systems) can be made part of a computational system by sensing the identity, position, and contents of the component artifacts. In effect, each task card has its content and position stored in a database, with movement of a particular task card automatically resulting in update of the database to record the new position of that task card. Tagged objects are typically documents, but may be physical icons, or other small physical artifacts attachable by magnets, pins, adhesives, frictional forces, or other conventional attachment mechanisms. Informational content of at least some of the plurality of tagged components can be directly determined by transfer/reading of information (which may be either an address to an electronic document, or the document information itself) from a passive microwave tag, or determined by position based associations maintained by a computer based microwave tracking system.

In preferred embodiments, the microwave tracking system provides a database with information necessary for constructing a series of time dependent snapshots of position and informational content. This database is updateable to reflect changes in position and informational content, while still retaining a time/action addressable record of state changes of the plurality of microwave tagged objects. This allows, for example, a user to digitally replay changes in a microwave tagged object collection, or determine the state of microwave tagged objects a day, a week, or a month earlier.

As will be appreciated by those skilled in the art, certain microwave tags may not be merely associated with electronic data (e.g. an electronically available text document or picture), but may actually "operate" on other tagged objects to define data relationships between tagged objects. Data can be altered, combined, erased, saved, augmented, transferred, or otherwise modified through provision of various digital services associated with "operator icons". In operation, a tagged object having associated electronic data is physically associated with an operator icon, causing modification of that associated electronic data in response to physical association of the operator icon with a tagged object. For example, consider a first tagged document and a second tagged object representing a user. An operator icon symbolically configured as a pointing arrow can be positioned to point from the first tagged object to the second tagged object. This association causes the system to electronically mail the first document to the user. Reversal of the arrow so that the arrow points from the user to the document can result in modification of document properties so that the user is linked to the document and informed of any updates, changes, or alterations to the document.

As will be appreciated, the foregoing scenarios require precise spatial discrimination of tagged objects, reliable transfer of data from the tag to the tracking system, and in some cases may even require transmission of data to the tag (for resetting identification numbers or adding information). Accordingly, for the purposes of the present invention microwave based systems (generally, but not exclusively operating in a frequency range of about 1 GHz to 30 GHz) for identification, spatial localization, and optional data transmission to tags are preferred over other known localization systems (e.g. camera based optical or acoustic). A microwave base station for tracking microwave tags allows for high speed scanning of a room with a narrow beam (providing angular localization), or use of multiple base stations for triangulation (providing three dimensional spatial triangulation). Passive microwave tags consume very little power since they do not directly emit radiation, but act by backscattering, or selectively modifying reflection of the microwave beam. The strong distance dependence ($1/r4$) of the microwave beam enhances separation between multiple base stations operating in a room, and permits pinpoint location of tags responding with encoded identification or other information. As will be appreciated, to help further distinguish tags, in certain embodiments mechanical or electrical phase shift techniques may be employed to reduce problems with half wave null positions for microwave tags relative to microwave base stations.

As will be understood, microwave tags can be purely passive, with passive backscattering information from resonant structures being predefined during tag construction. For example, a backscattered wave from a stub will be modulated (changing with respect to the directed microwave beam) in both amplitude and phase as the electrical length of the stub is varied. Such modulation can be accomplished by changing the voltage on a varactor diode connected to the stub, and generally requires very little power, since only a small back biased diode is continuously driven. A small CMOS circuit powered by a small lithium battery is therefore capable of continuously generating an identifiable signal in response to a directed microwave beam for a duration of several years.

Alternatively, more advanced microwave tags can be provided with additional analog or digital circuits for self modification (e.g. in response to tagged attached sensor or user input), or for modification in response to microwave base station requests. In certain embodiments of the present invention, active circuits in the tags can modifiable in response to both user input at the tag site (including voice data), and from the base station, permitting two way voice or other communications at very low power using precise microwave beam positioning to provide space-division multiplexing. This would be useful, for example, in connecting to an IP telephony system through a mobile phone handset equipped with suitable two way microwave tags. Using the present invention, a two way communication system with a low power mobile handset having a video type detector with baseband processing for the receiver and the self modifiable passive circuit for backscattering a microwave beam from the base station can be constructed. Such a system would have a very low receiver power consumption, essentially no transmit power consumption, and because of the spatially localized nature of the base station microwave beam, would not require complex time-division multiplexing or dynamic allocation schemes (e.g. MACA) for supporting multiple handsets in a room without interference.

Additional functions, objects, advantages, and features of the present invention will become apparent from consideration of the following description and drawings of preferred embodiments.

BRIEF DESCRIPTION OF THE DRAWINGS

FIG. 5 illustrates use of two separate detectors in a microwave base station to reduce problems associated with null signals;

FIG. 6 illustrates a phase detection circuit for a base station that uses a low cost branch line hybrid in place of a circulator;

DETAILED DESCRIPTION OF THE INVENTION

Figure 1:
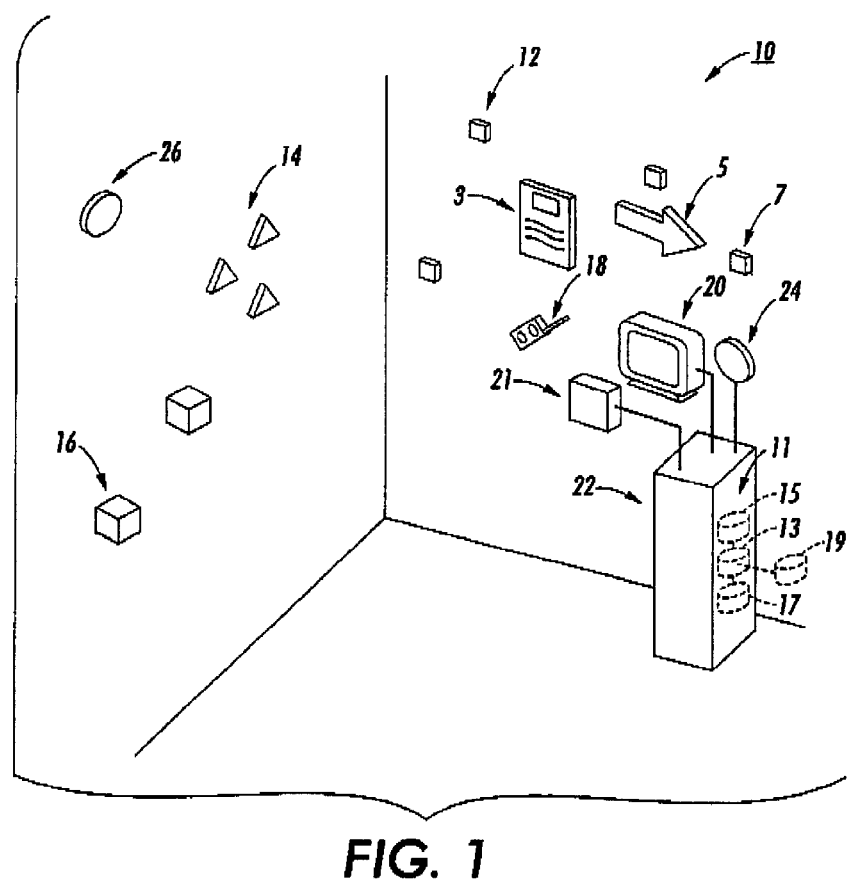
FIG. 1 schematically illustrates microwave based system for spatially localizing and identifying objects tagged or otherwise incorporating a passive microwave tag, with a network connected computer system maintaining positional and identifying information.

As illustrated with respect to FIG. 1, a system 10 for identification of tagged objects using scannable microwave beams includes a networkable information processing system 20 for spatial analysis, identification, and archival of information related to microwave tags. The microwave tags can respond to inquiries (directed microwave beams) from a microwave base station 24 in wired connection with a computer system 20, or a microwave base station 26 in wireless connection with a computer system 20. Tags can simply respond by modulating an incident microwave beam to provide a unique identifying backscattered signal (tag 12), or respond with temporally modulated signals based on sensor or user it (tags 14). More advanced tags can modify information carried by on-board memory in response to information change requests of the microwave base station (tags 16), or can support full two way voice communication (tagged handset 18).

Tags 12, 14, 16, or 18 can be deployed anywhere in the microwave scannable region of the room. Suitable room surfaces capable of retaining objects can include but are not limited to conventional walls, ceilings, floors, pinboards, writeable chalkboards or porcelain boards, desktops, tabletops, or even hanging tapestries. For example, tags permanently or temporarily positioned on a desktop, a wall adjacent to the desktop, or a file drawer can be detected. In other embodiments, a single wall mounted pin-board capable of holding microwave tagged pin or clip attached objects can be used. This latter embodiment is particularly useful for use in conjunction with a single microwave base station, since angular information alone can be used to spatially discriminate between tags. In certain embodiments particularly suitable for security monitoring, tags can be embedded in objects or otherwise not visually apparent.

Physical objects or artifacts suitable for tagging with passive microwave tags are typically documents, including but not limited to paper based textual documents 3, small electronic display screens, or textual material. Physical artifacts may also include wall mounted containers having signaling lights, or attachable symbolic icons such as arrow 5. As will be appreciated, physical artifacts that can be tagged with suitable microwave tags also include the various documents, notecards, calendars, task schedules, phone number lists, project proposals, informational flyers, meeting announcements, photographs, maps, keys, or magnetic icons commonly used to organize or disseminate information for individuals or groups.

For purposes of the present invention, documents or other data associated with microwave tagged objects should be accessible after automatic or semi-automatic identification of a tagged object by an information database and tracking system 11, software normally capable of running on networked computer 22 of system 10. Document content or other data associated with an identified microwave tag can be determined directly from a tag signal, or can be accessed from an electronic document database in response to transmission of an electronic address, URL, database record number, or other suitable document or data tracking information stored locally on computer 22 or accessible by network. In preferred embodiments, the system 11 provides a database 17 optionally connectable to external databases 19. A tag tracking database 13 connected to a microwave beam controller 15 together determine and track changes in tag position. In conjunction with database 17, the system 11 can provide a user with information necessary for constructing a series of time dependent snapshots of position and informational content. The database 13 is updateable to reflect changes in position, and databases 17 and 19 are updateable to reflect changes in informational content, while still retaining a time/action addressable record of state changes of the plurality of microwave tagged objects. This allows, for example, a user to digitally replay changes in a microwave tagged object collection, or determine the state of microwave tagged objects a day, a week, or a month earlier. In operation, a user (not shown) receives information concerning current or past tag state from database and tracking system 11 of system 20. Such information can be provided visually by a monitor attached to networked computer 22, or by various projections, audible reports, or other user signaling mechanisms supported by the user input/output module 21.

Advantageously, in conjunction with appropriate identification, location, user input, and user output systems, the system 10 can be used to:

1) determine identity of text or graphics on documents 3 printed on physical media and removably attached to a surface, associating them with electronic documents accessible through networked computer 22;

2) sense the location of microwave tagged documents or other physical artifacts, either in absolute coordinates or relative (e.g. angular differentiation) to a microwave base station or other tagged documents;

3) perform useful operations based on sensed actions performed by users of the system 10, including, for example, modifications to application priorities based on location changes of tagged documents;

4) provide electronically controlled enhancement of tags using visual, auditory, or tactile markers (e.g. using light emitting diodes supported by pins holding documents, projected laser dots from media input/output unit 21 for highlighting, audible buzzers, either automatically or in response to user actions);

5) display more complete information relating to documents by visual projection from media input/output unit 21, or by printing documents, in response to user requests; and 6) sense, interpret, and capture user actions relating to movement of microwave tagged objects, with audio or video of the user being optionally recorded to capture, gestures, conversations or annotative comments.

As those skilled in the art will appreciate, the use of operators, whether predefined by association in the database with a unique identification signal, or constructed by users "on the fly", permits construction of powerful symbolic or visual languages for interfacing with an information database accordance with the present invention. For example, each differently identified physical icon (tagged object) can be associated with a particular digital service or attribute. Although the wide variety of easily distinguishable icons and spatial positioning characteristics (icons being inverted, moved adjacent, moved to overlap, identified with pointers, drawn arrows, etc.) would alone provide a powerful user interface, the use of an archival (i.e. event) database in the present invention further extends the flexibility of the information collage based user interface by supporting computer control based on a temporally differentiated icon input, with temporally synchronous (or asynchronous) tuples of one or more icons (e.g. particular identified icons and sensed states) operating on data. Single and multiple icons can in turn be extended by participation in a "sentence". A sentence is defined as a sequence of one or more temporally disjoint icon attributes or positionings. The sentence level allows definition of an input grammar by appropriate choice of sequence or position, and corollary rules governing, for example, use of active verb-like icons (e.g. "SEND TO"), naming noun-like operators (e.g. DOC1.TXT), or connectors (e.g. AND).

To better illustrate operation of the present invention, consider an example scenario wherein system 10 is configured to track and identify surface mountable physical artifacts (i.e. physical icons) associated with virtual applications, documents or objects, or digital services. In operation, a tagged object such as document 13 having associated textual and electronic data is physically associated with an operator icon shaped as an arrow 5. The arrow 5 supports two microwave tags having unique identification signals, allowing the arrow direction to be distinguished by system 10. Placing the arrow 5 with respect to the various tags causes modification of that associated electronic data in response to physical association of the operator icon (arrow 5) with a tagged object (e.g. object 7 with embedded microwave tag). For example, consider a situation where tagged document 3 is positioned near object 7 symbolically representing a user. An operator icon symbolically configured as a pointing arrow 5 can be positioned to point from the document 3 toward object 7. This association causes the database and tracking system 11 of system 10 to electronically mail the document to the user. Reversal of the arrow 5 so that the arrow points from the user symbol to the document 3 can result in modification of document properties, linking the user in the database 17 to the document and automatically informing the user of any updates, changes, or alterations to the document.

Figure 2:
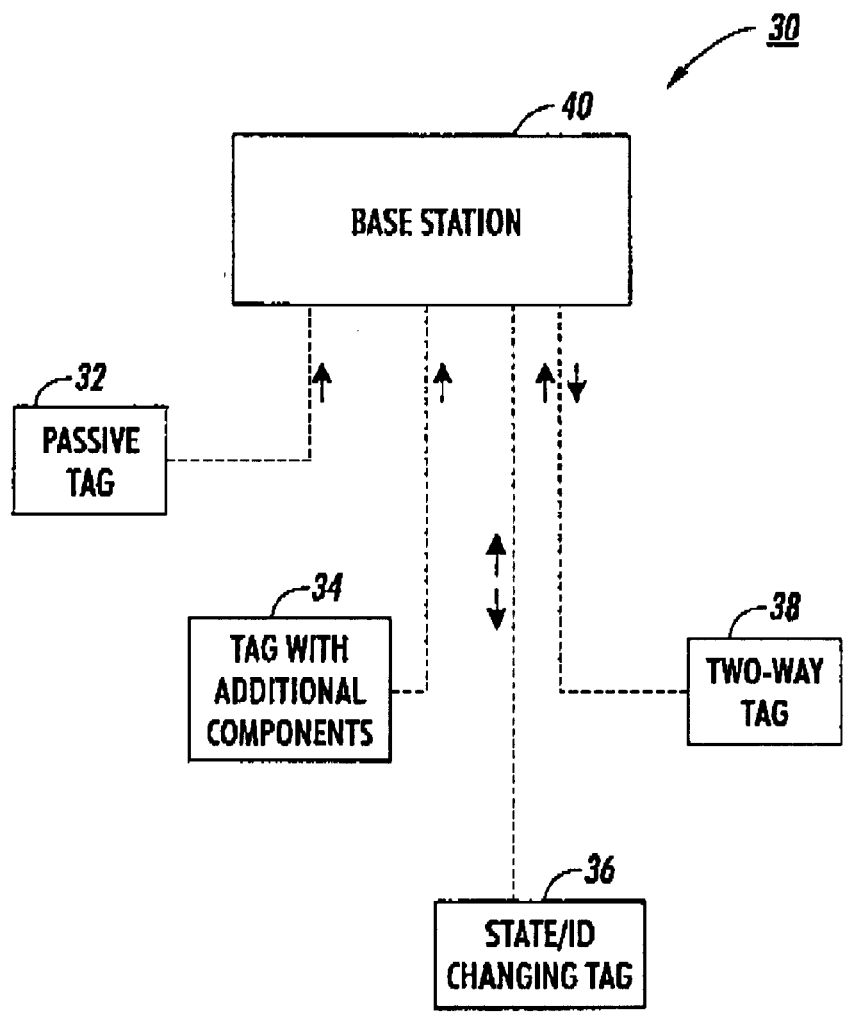
FIG. 2 illustrates one way, limited two way, and full two way communication between a microwave base station and various microwave tag embodiments.

Implementation of the foregoing described scenarios is facilitated by provision of multiple low cost, reliable, and narrow beam microwave base stations for directing and receiving multiple microwave beams for locating and identifying microwave tags. As seen in FIG. 2, a suitable embodiment of a microwave base station 40 can be designed to accept or transmit information to various microwave tags. A purely passive tag 32 (such as tags 12 in FIG. 1) will respond to a directed beam of microwave radiation by amplitude or phase modulating the directed microwave beam in a unique manner that distinguishes the passive tag 32 from others that may be present in the room. More sophisticated tags 34 (such as tags 14 in FIG. 1) may include sensor systems, switches, buttons, or other user or environmental triggers that selectively modify modulated output. For example, in response to flipping a toggle, a modulated on/off bit can be added to the identification bits, associating the tag with either an "ON" position or an "OFF" position as required.

Even more sophisticated designs for tags 36 enable transmissions by a base station to selectively modify identification or state of tags 36. A series of microwave beam pulses, frequency or amplitude changes, or bitwise transmission of data from the base station to the tag can be stored by onboard memory or result in permanent or temporary identification circuit modifications. In certain embodiments of the invention, tags 38 can even support full two way communication between a base station and digital or analog circuitry attached to the tag 38. For example, a two way communication system with a low power mobile voice handset having a video type detector with baseband processing for the receiver and the self modifiable passive circuit for backscattering a microwave beam from the base station can be constructed. Such a microwave tag 38 based system would have a very low receiver power consumption, essentially no transmit power consumption, and can easily support multiple handsets in a room without interference.

Figure 3:
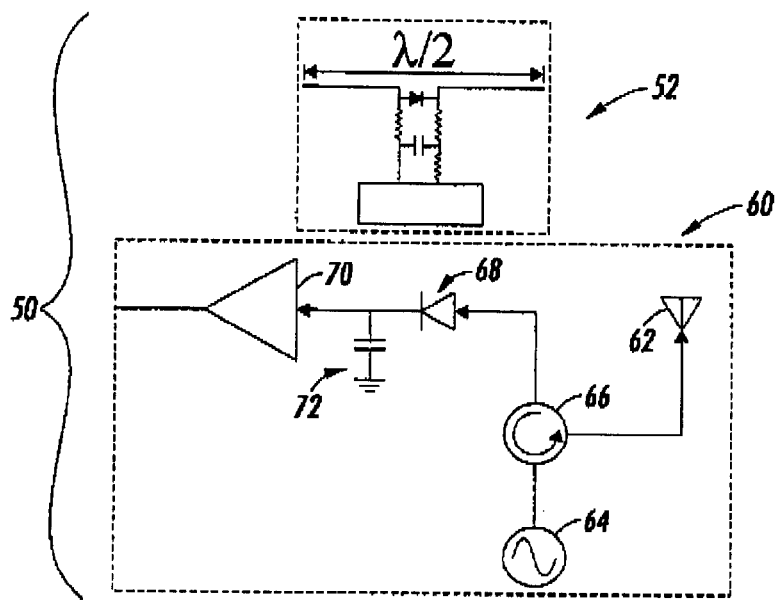
FIG. 3 illustrates an amplitude modulated microwave base station and a passive microwave tag.

Various base station designs are suitable for use in the present invention. For example, as seen in FIG. 3, a passive microwave amplitude tracking system 50 uses base station 60 to track backscattered amplitude variations in a passive microwave tag 52. The microwave base station 60 includes a C-band oscillator 64 (e.g. type VTO-8520 manufactured by Avantek) that provides 10 mW at a frequency of about 5 GHz. A circulator 66 (or alternatively, a hybrid junction) couples the oscillator 64 signal to an antenna 62 for transmitting a microwave beam. The oscillator 64 signal is substantially suppressed by detector 68, a zero bias Schottky diode (e.g. Metallics #MSS20). Any received signals from antenna 62 are coupled to detector 68, which in conjunction with bypass capacitor 72 produces a baseband signal representing amplitude modulation of the backscattered signal from microwave tag 52. Amplifier circuit 70 amplifies this signal and transfers it to logic circuits (e.g. a PCI card in a suitable computer system, not shown).

Figure 4:
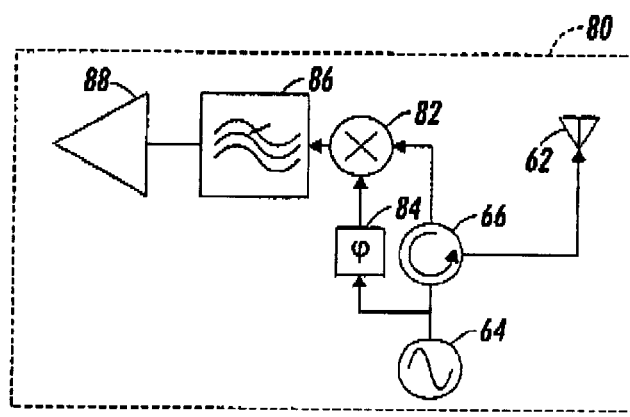
FIG. 4 illustrates a phase sensitive microwave base station.

Alternatively, FIG. 4 illustrates a phase, not amplitude, sensitive receiver that also includes C-band oscillator 64 and a circulator 66. As in the system illustrated in FIG. 3, the circulator 66 couples the oscillator 64 signal to an antenna 62 for transmitting a microwave beam. Any backscattered signal received is carried to a mixer 82 by circulator 66. An unscattered oscillator signal is carried to a phase shift network 84 to undergo a phase shift. This phase shifted output is directed to mixer 82, which outputs a signal sensitive to the phase difference between the local oscillator signal from oscillator 64 and the backscattered signal received by antenna 62. A lowpass filter 86 passes the baseband mixer signal to an amplifier 88. Logic operations are performed on the amplified signal by suitable digital logic circuits (not shown).

While the foregoing phase shift system generally works better than amplitude systems such as described in connection with FIG. 3 (primarily because of the greater effective dynamic range), there are still potential detection problems. For example, in certain positions a passive microwave tag could backscatter a null with respect to the base station receiver. Such a null would occur at every half wavelength of the carrier frequency (making it generally on the order of one centimeter) as a tag position is changed. For this reason, the phase shift network can be adjusted to flip periodically between a phase shift of either 0 or 90 degrees. In operation, this eliminates a null return, since what is a null for 0 degrees is a maxima for 90 degrees, or vice versa.

Problems with null returns can also be alleviated by use of multiple detector systems 90 as illustrated with respect to FIG. 5. An oscillator 64 and a circulator 66 substantially identical to that previously described are used. The circulator 66 couples the oscillator 64 signal to an antenna 62 for transmitting a microwave beam. In addition, the circulator 66 feeds a return signal to detectors 92 and 93. The detectors 92 and 93 also accept a phase quadrature signal from a quadrature hybrid 95 connected to oscillator 64. In operation, a null signal at one detector will be a peak signal (maxima) at the other detector. As will be appreciated, low pass filters 96 and 97, and amplifiers 98 and 99 operate to provide two separate signal streams. Since one stream will at any time have a higher signal integrity (since peak signals are amplified more than null signals), logic decoding apparatus connected to the amplifier (not shown) can be used to identify and interpret that higher signal integrity stream of data.

An inexpensive variant of the foregoing phase detectors is schematically illustrated by FIG. 6. Instead of a relatively expensive circulator, the antenna 62 and oscillator 64 are connected to a branch line hybrid 67. The branch line hybrid 67 can be constructed by inexpensive layout of quarter wave traces on printed circuit boards. In operation, some portion of oscillator 64 signal is diverted to an electrically controlled phase shift network formed by the combination of branch line hybrid 69 (again using printed circuit board quarter wave traces) and varactor diodes 104. A bias network 108 is partially isolated from this branch line hybrid 69 using an interconnected quarter wave stub 106.

Figure 7:
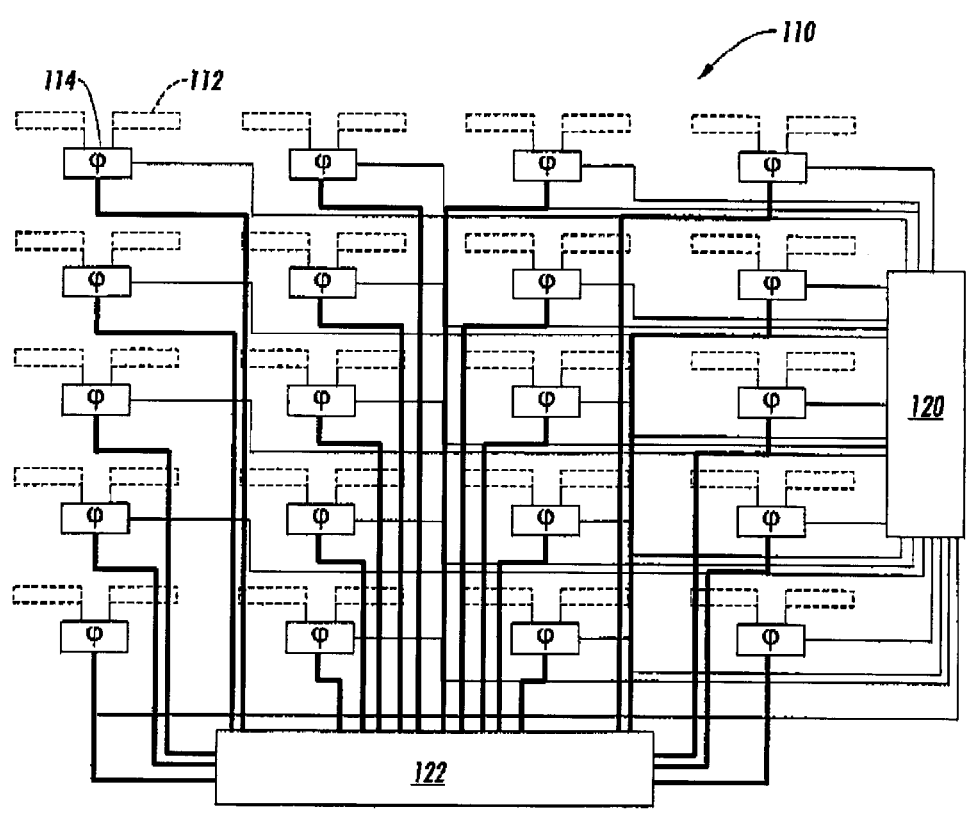
FIG. 7 schematically illustrates logical construction of a phased array antenna suitable for use in one or two way communication schemes according to the present invention, or when mechanical antenna steering is unsuitable.

To ensure accurate spatial localization of microwave tags distributed throughout a room, the narrow beam microwave signal produced by the foregoing transmitters and receivers is generally configured to be mechanically or electronically scannable. Mechanical scanning can include use of known gimbaled mounts, or other conventional rotatable antenna mounting systems movable in two or three dimensions. For unobtrusive operation, electronically scannable phase array antenna systems 110 such as illustrated in FIG. 7 are often preferred. As seen in FIG. 7, a processor 120 controlled twenty-way power divider 122 drives each of twenty phase shift networks 114. Antennas 112 are respectively connected to each phase shift network 114, permitting processor controlled electronic beam steering and reception. Such systems are substantially flat, and multiple antenna bearing phase array antenna systems can be easily positioned at various locations in a room for three dimensional coverage. Because of their sensitivity, accuracy, and high speed beam directionality changes, phase array antennas are particularly useful for embodiments of the invention supplying two way communications with mobile (e.g. bitstream data, phone handset audio data, or even video data) sensor connected microwave tags.

For example, using a microwave responsive tag having a passive modulating element to uniquely backscatter directed microwave beams and provide a signal, a sensor circuit is connected to the passive modulating element of the microwave responsive tag. State of the sensor circuit selectively modifies the signal, permitting two-way communication with a microwave base station, with the microwave base station having a tag tracking circuit (based on limited scanning, or scanning to maintain optimal amplitude signal using conventional tracking and lock-on techniques) to direct the microwave beam toward the microwave responsive tag even as the microwave responsive tag is spatially displaced. As will be appreciated, the tracking antenna can be a phase array (for best results), or can involve physically scanning the antenna in certain embodiments.

Figure 8:
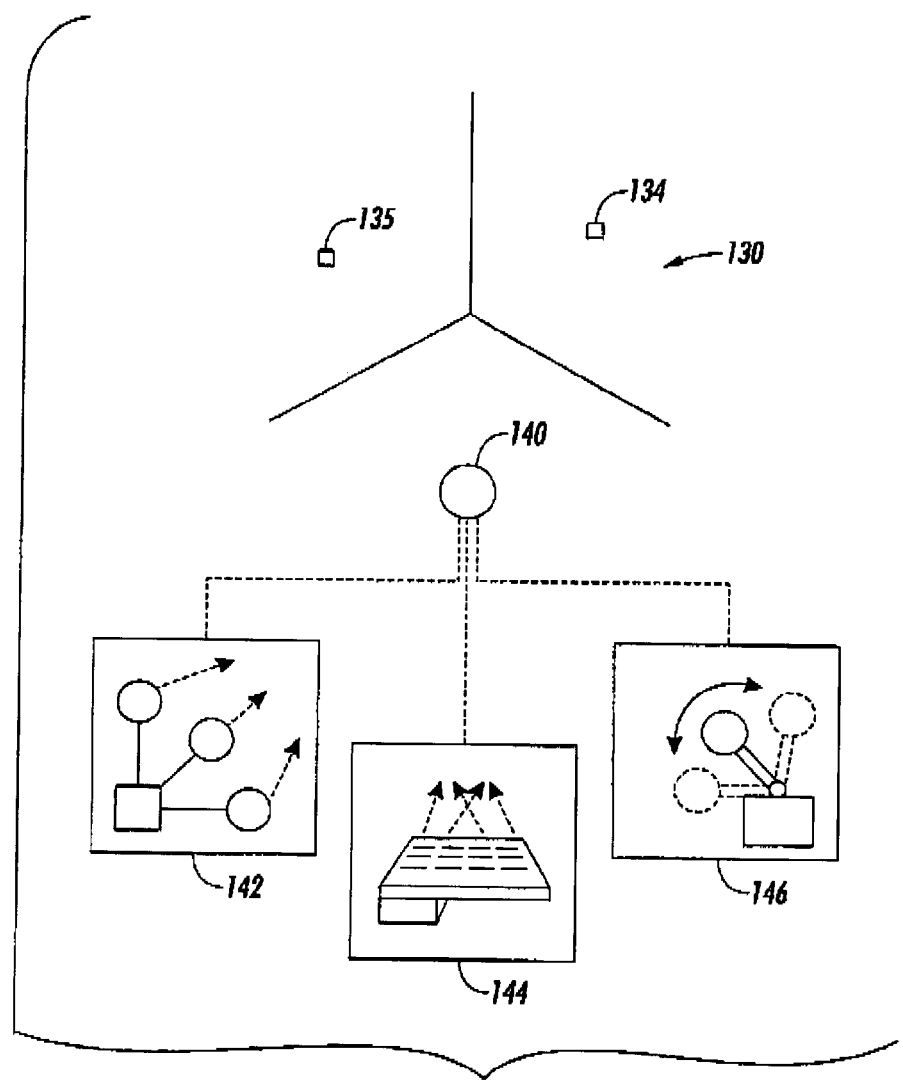
FIG. 8 illustrates various mechanisms for determining angular location, or by triangulation, spatial location of a microwave tag.

To better appreciate the present invention, FIG. 8 illustrates various systems 130 for spatial localization of multiple tags 134 and 135 in a room 132. To spatially localize the tags, a microwave based detection system 140 can provide multiple scannable antennas 142, use electronically steerable antenna arrays 144, or have gimballed or rotationally mounted antennas 146. Information from multiple antennas can be combined, permitting conversion of angular information into accurate three dimensional triangulation. Note that for certain applications, only angular information from a single antenna system may be required to spatially separate microwave tagged objects (e.g. when scanning a single wall surface, or when using phase array antenna that permits multiple portions of the array to directing multiple beams at a differing angles, providing limited triangulation for nearby microwave tags). For more general applications, multiple antenna systems are preferred.

As those skilled in the art will appreciate, other various modifications, extensions, and changes to the foregoing disclosed embodiments of the present invention are contemplated to be within the scope and spirit of the invention as defined in the following claim.

What is claimed is:

1. A system for identification and tracking of microwave responsive tags, the system comprising,
   a microwave responsive tag having a passive modulating element to uniquely backscatter directed microwave beams,
   a microwave base station for directing microwave beams in room sized areas, and
   a tag tracking system receiving input from the microwave base station, the tag tracking system storing state records of position and informational content of the microwave tag, wherein the tag tracking system determines angular position of the microwave responsive tag with respect to the microwave base station.

2. The system of claim 1, wherein the microwave responsive tag is attached to a document.

3. The system of claim 1, wherein the microwave responsive tag is embedded in an object.

4. A system for identification and tracking of microwave responsive tags, the system comprising,
   a microwave responsive tag having a passive modulating element to uniquely backscatter directed microwave beams and provide a signal,
   a sensor circuit connected to the passive modulating elements, with state of the sensor circuit selectively modifying the signal,
   a microwave base station for directing microwave beams in room sized areas, and
   a tag tracking system receiving input from the microwave base station, the tag tracking system storing state records of position and informational content of the microwave tag, wherein the microwave base station generates a signal receivable by the sensor circuit to change sensor circuit state and selectively modifying the signal.

5. The system of claim 4, wherein the tag tracking system determines angular position of the microwave responsive tag with respect to the microwave base station.

6. The system of claim 4, further comprising at least two microwave base stations, and wherein the tag tracking system determines absolute position of the microwave responsive tag based on input from at least two microwave base stations.

7. The system of claim 4, wherein the microwave responsive tag further comprises a resonant circuit that amplitude modulates a backscattered directed microwave beam.

8. The system of claim 4, wherein the microwave responsive tag further comprises a Complimentary Metal Oxide Semiconductor circuit for varying voltage on a varactor diode connected to the stub to selectively amplitude modulate a backscattered directed microwave beam.

9. The system of claim 4, wherein the microwave responsive tag further comprises a resonant circuit that phase modulates a backscattered directed microwave beam.

10. The system of claim 4, wherein the microwave responsive tag further comprises a Complimentary Metal Oxide Semiconductor circuit for varying voltage on a varactor diode connected to the stub to selectively phase modulate a backscattered directed microwave beam.

11. The system of claim 4, wherein the microwave responsive tag is attached to a document.

12. The system of claim 4, wherein the microwave responsive tag is embedded in an object.

13. A system for identification and tracking of microwave responsive tags, the system comprising,
   a microwave responsive tag having a passive modulating element to uniquely backscatter directed microwave beams,
   a microwave base station for directing microwave beams in room sized areas,
   a tag tracking system receiving input from the microwave base station, the tag tracking system storing state records of position and informational content of the microwave tag, and
   at least two microwave base stations, and wherein the tag tracking system determines absolute position of the microwave responsive tag based on input from at least two microwave base stations.

14. The system of claim 13, wherein the microwave responsive tag is attached to a document.

15. The system of claim 13, wherein the microwave responsive tag is embedded in an object.

16. A system for identification and tracking of microwave responsive tags, the system comprising,
   a microwave responsive tag having a passive modulating element to uniquely backscatter directed microwave beams,
   a microwave base station for directing microwave beams in room sized areas, and
   a tag tracking system receiving input from the microwave base station, the tag tracking system storing state records of position and informational content of the microwave tag, wherein the microwave responsive tag further comprises a resonant circuit that amplitude modulates a backscattered directed microwave beam.

17. A system for identification and tracking of microwave responsive tags, the system comprising,
   a microwave responsive tag having a passive modulating element to uniquely backscatter directed microwave beams,
   a microwave base station for directing microwave beams in room sized areas, and
   a tag tracking system receiving input from the microwave base station, the tag tracking system storing state records of position and informational content of the microwave tag, wherein the microwave responsive tag further comprises a Complimentary Metal Oxide Semiconductor circuit for varying voltage on a varactor diode connected to the stub to selectively amplitude modulate a backscattered directed microwave beam.

18. A system for identification and tracking of microwave responsive tags, the system comprising,
   a microwave responsive tag having a passive modulating element to uniquely backscatter directed microwave beams,
   a microwave base station for directing microwave beams in room sized areas, and
   a tag tracking system receiving input from the microwave base station, the tag tracking system storing state records of position and informational content of the microwave tag, wherein the microwave responsive tag further comprises a resonant circuit that phase modulates a backscattered directed microwave beam.

19. A system for identification and tracking of microwave responsive tags, the system comprising,
   a microwave responsive tag having a passive modulating element to uniquely backscatter directed microwave beams,
   a microwave base station for directing microwave beams in room sized areas, and
   a tag tracking system receiving input from the microwave base station, the tag tracking system storing state records of position and informational content of the microwave tag, wherein the microwave responsive tag further comprises a Complimentary Metal Oxide Semiconductor circuit for varying voltage on a varactor diode connected to the stub to selectively phase modulate a backscattered directed microwave beam.

20. A system for identification and tracking of microwave responsive tags, the system comprising, a microwave responsive tag having a passive modulating element to uniquely backscatter directed microwave beams, a microwave base station for directing microwave beams in room sized areas, and a tag tracking system receiving input from the microwave base station, the tag tracking system storing state records of position and informational content of the microwave tag, wherein the tag tracking system can generate a series of time dependent snapshots of position of microwave responsive tags and any associated informational content.

* * * * *